United States Patent
Li et al.

(10) Patent No.: US 12,024,582 B2
(45) Date of Patent: Jul. 2, 2024

(54) PREPARATION METHOD FOR POLYURETHANE OPTICAL RESIN AND APPLICATIONS THEREOF

(71) Applicants: WANHUA CHEMICAL GROUP CO., LTD., Shangdong (CN); WANHUA CHEMICAL (NINGBO) CO., LTD., Zhejiang (CN)

(72) Inventors: Jianfeng Li, Shangdong (CN); Yonghua Shang, Shangdong (CN); Qian Wu, Shangdong (CN); Fulin Zhu, Shangdong (CN); Peng Wang, Shangdong (CN); Hao Chen, Shangdong (CN); Peimeng Shi, Shangdong (CN); Weiqi Hua, Shangdong (CN); Yuan Li, Shangdong (CN)

(73) Assignees: WANHUA CHEMICAL GROUP CO., LTD., Shangdong (CN); WANHUA CHEMICAL (NINGBO) CO., LTD., Zhejiang (CN)

( * ) Notice: Subject to any disclaimer, the term of this patent is extended or adjusted under 35 U.S.C. 154(b) by 23 days.

(21) Appl. No.: 17/608,393

(22) PCT Filed: Jul. 20, 2020

(86) PCT No.: PCT/CN2020/103019
§ 371 (c)(1),
(2) Date: Nov. 2, 2021

(87) PCT Pub. No.: WO2021/017921
PCT Pub. Date: Feb. 4, 2021

(65) Prior Publication Data
US 2022/0227915 A1    Jul. 21, 2022

(30) Foreign Application Priority Data
Jul. 29, 2019    (CN) .......................... 201910687252.9

(51) Int. Cl.
*C07D 251/00* (2006.01)
*C08G 18/24* (2006.01)
(Continued)

(52) U.S. Cl.
CPC ....... *C08G 18/3876* (2013.01); *C08G 18/242* (2013.01); *C08G 18/758* (2013.01);
(Continued)

(58) Field of Classification Search
CPC .... G02B 1/04; C08G 18/3876; C08G 18/242; C08G 18/758; C08G 18/7642; C07D 251/34
See application file for complete search history.

(56) References Cited

U.S. PATENT DOCUMENTS 5,576,412 A    11/1996  Hirata et al.
6,201,099 B1   3/2001   Petersen et al.
(Continued)

FOREIGN PATENT DOCUMENTS

CN    1681864 A     10/2005
CN    101678620 A   3/2010
(Continued)

OTHER PUBLICATIONS

INSPUR Project: Quality Control Protocols. Ref. Area (2016), p. 1-28.*
(Continued)

*Primary Examiner* — Michael L Leonard
(74) *Attorney, Agent, or Firm* — Norton Rose Fulbright US LLP; James R. Crawford

(57) ABSTRACT

Preparation method for a polyurethane optical resin and applications thereof. The preparation method for the polyurethane optical resin comprises: a raw material composition comprising isocyanate and a polythiol compound undergoes a polymerization to produce the polyurethane optical resin.

(Continued)

The turbidity value of the isocyanate used in the raw material composition is controlled at ≤2 NTU. The polyurethane optical resin produced is applicable in manufacturing optical products.

5 Claims, 1 Drawing Sheet

(51) Int. Cl.
*C08G 18/38* (2006.01)
*C08G 18/75* (2006.01)
*C08G 18/76* (2006.01)
*C08K 5/521* (2006.01)
*G02B 1/04* (2006.01)

(52) U.S. Cl.
CPC .......... *C08G 18/7642* (2013.01); *C08K 5/521* (2013.01); *G02B 1/04* (2013.01)

(56) References Cited

U.S. PATENT DOCUMENTS

| | | | |
|---|---|---|---|
| 2003/0220462 | A1 | 11/2003 | Porzio et al. |
| 2010/0201939 | A1 | 8/2010 | Itoh et al. |
| 2019/0225733 | A1* | 7/2019 | Kousaka ............ C08G 18/3876 |
| 2019/0225771 | A1 | 7/2019 | Kousaka |
| 2022/0213028 | A1* | 7/2022 | Eggert ................. C07C 263/20 |

FOREIGN PATENT DOCUMENTS

| | | | |
|---|---|---|---|
| CN | 102964566 | A | 3/2013 |
| CN | 106164120 | A | 11/2016 |
| CN | 106164709 | A | 11/2016 |
| CN | 106414538 | A | 2/2017 |
| CN | 106588798 | A | 4/2017 |
| CN | 107057012 | A | 8/2017 |
| CN | 107189034 | A | 9/2017 |
| CN | 107200846 | A | 9/2017 |
| CN | 108003072 | A | 5/2018 |
| CN | 108559058 | A | 9/2018 |
| CN | 108586705 | A | 9/2018 |
| CN | 109761855 | A | 5/2019 |
| EP | 0630927 | A2 | 12/1994 |
| EP | 3736263 | A1 | 11/2020 |
| JP | 2005258409 | A | 9/2005 |
| JP | 2012082415 | A | 4/2012 |
| JP | 2014234429 | A | 12/2014 |
| JP | 2018178000 | A | 11/2018 |
| KR | 101935032 | B1 | 1/2019 |
| WO | 2017022946 | A1 | 2/2017 |
| WO | 2018212334 | A1 | 11/2018 |
| WO | 2019007895 | A1 | 1/2019 |
| WO | 2019132491 | A1 | 7/2019 |

OTHER PUBLICATIONS

"Guide to Handling isocyanates." www.swa.gov.au, safe work australia, Jul. 2015, p. 1-14.*
Office Action issued on Oct. 31, 2022 by the JPO in the corresponding Patent Application No. 2022-512477, with English translation.
Sun, et al.: "Biodegradable and temperature-responsive polyurethanes for adriamycin delivery", Int'l J. of Pharmaceutics 412 (2011), pp. 52-58.
International Search Report issued in PCT/CN2020/103019 on Oct. 22, 2020.
Office Action issued on May 24, 2021 by the CIPO in the corresponding Patent Application No. 201910687252.9, with English translation.
Supplementary European Search Report issued on Aug. 8, 2023 in the corresponding patent application No. 20847915.4-1102.

* cited by examiner

PREPARATION METHOD FOR POLYURETHANE OPTICAL RESIN AND APPLICATIONS THEREOF

CROSS REFERENCE TO RELATED APPLICATIONS

This application is a national phase under 35 U.S.C. § 371 of International Application No. PCT/CN2020/103019 filed on Jul. 20, 2020, which claims the benefit of priority from Chinese Patent Application 201910687252.9 filed on Jul. 29, 2019. The entire contents of these applications are incorporated herein by reference in their entirety.

TECHNICAL FIELD

The present disclosure belongs to the field of polyurethane resin materials and, in particular, to a preparation method and application of a polyurethane optical resin.

BACKGROUND

Optical materials are widely used for producing spectacle lenses, windshields of airplanes and automobiles, window glasses and optical elements such as lenses and prisms. Traditional optical materials are mainly inorganic glass and have the disadvantages of a high density, poor impact resistance and being easy to cause damages to human bodies after broken. Polymer optical materials have the characteristics of a low density, a light weight, high transparency, impact resistance and being easy to shape and machine. Optical resin lenses occupy an increasingly higher market share year by year and tend to be popularized.

Polyurethane resins are one of the most important optical resins and obtained through a polymerization reaction of an isocyanate and a polythiol compound. Such optical resins have excellent characteristics such as a high refractive index, a light weight, impact resistance, good tintability and being easy to machine. Due to a relatively high refractive index, polyurethane lenses can be made thinner and more beautiful, which is the development trend of resin lenses in the future.

Generally, within the range of visible light, the loss in transmittance of optical plastics is mainly caused by three factors: light reflection, scattering and absorption. Light scattering is caused by the internal inhomogeneity of an optical medium. The isocyanate used as a raw material has a significant effect on the physical performance of products.

At present, in the field of polyurethane optical resins, there are few related patents focusing on the quality of isocyanate monomers. Most researches on the factors affecting the quality of a lens resin focus on an effect of chlorine. In U.S. Pat. No. 5,576,412, a lens resin good in quality can be obtained through an isocyanate with less than 300 ppm of hydrolyzed chlorine and in an example, XDI with 120 ppm of hydrolyzed chlorine was used for preparing a lens resin. In JP2014234429, a lens resin good in quality can be obtained through limiting alpha-chlorinated impurities to 1-250 ppm in XDI. In Patent No. CN108586705A of SKC, it is mentioned that the content of chlorine in an XDI composition is controlled to be 100-1000 ppm, where chlorine includes at least one of chloride ions and a chlorine-based storage stabilizer so that the storage stability and reactivity of XDI can be maintained to be not reduced. Patent No. CN107189034A discloses a formula of an anti-yellowing resin lens composition, where the formula includes an isocyanate, a polythiol, a release agent, a catalyst and an antioxidant, and the isocyanate contains a small amount of chloride ions. An anti-yellowing optical resin is prepared by controlling the content of chloride ions and a particular antioxidant.

In summary, at present, the main manner of controlling the optical performance and appearance quality of polyurethane resin products and the stability of polyurethane compositions from the perspective of raw materials is to control the effect of chlorine in the raw materials.

SUMMARY

In a process of obtaining a polyurethane optical resin through polymerization of an isocyanate and a polythiol compound, a product may sometimes be affected by various impurities, resulting in optical distortion which adversely affects the performance of an optical product. An object of the present disclosure is to provide a quality control method of a polyurethane optical resin. A polyurethane optical resin product with good optical performance and appearance quality can be obtained by the method so that the defective percentage of the optical product is effectively reduced.

A process of machining an optical material generally consists of mixing a chemical monomer and an initiator (catalyst) according to a formula, vacuum degassing followed by injected the mixture into a mold, curing through programmed temperature control, and then processing post-treatment. When a resin contains a certain amount of solid particles, there will be polymerization, absorbing water and reacting to form urea, and the like, during storage and use of the resin, so that the resin becomes hazy and turbid, accompanied by decreased transparency and a decreased refractive index, which degrades the appearance of the product and affects the quality of the product. Some of these impurities are dissolved and some are suspended. According to the knowledge of colloid chemistry, dispersed particles with a relatively small particle size cannot be distinguished by naked eyes or a microscope and is transparent in appearance; when dispersed particles have a relatively large particle size, dispersed phases can be observed by the naked eyes or an ordinary microscope. For relatively large particles, light can be prevented from passing through or optical scattering occurs so that the resin is turbid and opaque in appearance.

So far, quality determination methods of isocyanates used in optical resins at home and abroad mainly include determining indicators such as color, purity and hydrolyzed chlorine. Commercially available isocyanates, even if purified, may contain a small amount of impurities, which degrades the physical performance of products and is not conducive to long-term storage. This situation will eventually lead to serious problems (such as ripples, faintness, spots or blisters) in the field of optical lenses that require high transparency and optical properties.

To achieve the above object, the present disclosure provides the technical solutions below.

A preparation method of a polyurethane optical resin includes subjecting a raw material composition containing an isocyanate and a polythiol compound to a polymerization reaction to obtain the polyurethane optical resin, where turbidity of the isocyanate in the raw material composition is controlled to be less than or equal to 2 NTU, preferably less than or equal to 1 NTU, more preferably less than or equal to 0.5 NTU, and further more preferably less than or equal to 0.3 NTU. Of course, the turbidity may be controlled to be lower, for example, more preferably less than or equal to 0.25 NTU.

Turbidity is measured with an instrument called a turbidimeter. The turbidimeter emits parallel light to pass through a length of a sample and detects how much light is scattered by particles in water from a direction at 90° to incident light. This scattered light measurement method is called a scattering method. The international standard unit of turbidity, NTU, is defined using a stably suspended organic compound (a polymer of hydrazine sulfate and hexamethylenetetramine) as a standard turbidity substance. NTU is short for Nephelometric Turbidity Unit.

The magnitude of the turbidity is mainly related to the size, distribution and quantity of colloidal particles in a test product. It is generally believed that smaller particles, more uniform distribution and the smaller quantity correspond to smaller turbidity. Among the three factors of size, distribution and quantity of solid particles, the size of a colloidal particle can be determined while the quantity and distribution are difficult to measure directly. Many factors affect the turbidity, including the five factors in total quality management: personnel, machinery, raw materials, methods and the environment. Process factors that affect the turbidity of a monomer include plant conditions, temperature and humidity conditions, parameter control, equipment condition control, and operation skill and stability.

The method for controlling the quality of a raw material by measuring turbidity has good accuracy and feasibility, the data is easy to analyze, and low professional requirements are imposed on operators so that the method is suitable for fast and convenient quality monitoring requirement of the factory.

It is found through researches in the present disclosure that the turbidity of the isocyanate in an isocyanate raw material used for preparing the polyurethane optical resin affects the quality of the polyurethane optical resin, especially is closely related to indicators such as transmittance of the product.

At present, in the field of production of polyurethane optical resins, no attention has been paid to an effect of the turbidity of the isocyanate present in the isocyanate raw material on production. Using xylylene diisocyanate as an example, the presence of other impurities such as 4-cyanobenzyl isocyanate, 2-chloromethylbenzyl isocyanate and chlorobenzene that are low in content reduces the purity of the product and affects the quality of the product. However, the effect of the turbidity of the isocyanate on production and application is different from an effect of the preceding other impurities. Based on isocyanate use conditions approved in the art (such as reports on storage conditions of isocyanates in the literature and actual industrial production experience), the present disclosure finds a change of the turbidity of the raw material and notices that when the change exceeds a certain specific range, the prepared polyurethane optical resin will be non-uniform in structure, which leads to a change in product quality. When the turbidity of the isocyanate in the isocyanate raw material exceeds a certain specific value, deformation or deterioration of transparency occurs, which reduces the product qualification ratio. Abnormalities can be effectively suppressed through controlling the turbidity of the isocyanate in the isocyanate raw material used in the raw material composition, and a transparent and high-performance polyurethane optical resin with qualified indicators can be obtained.

The isocyanate used in the raw material composition is selected from an aliphatic and/or an aromatic isocyanate, where the aliphatic isocyanate is preferably one or more of hexamethylene diisocyanate, methylcyclohexyl diisocyanate, dimethylcyclohexyl diisocyanate, dicyclohexylmethane diisocyanate, isophorone diisocyanate, norbornane diisocyanate and cyclohexyl dimethylene diisocyanate, and the aromatic isocyanate is preferably one or more of toluene diisocyanate, p-phenylene diisocyanate and xylylene diisocyanate; and the isocyanate is more preferably cyclohexyl dimethylene diisocyanate and/or xylylene diisocyanate.

The polythiol compound used in the raw material composition is selected from one or more of ethylene glycol bis(thioglycolate), diethylene glycol bis(thioglycolate), glycerol tris(thioglycolate), propylene glycol bis(thioglycolate), butanediol bis(thioglycolate), trimethylolpropane tris (thioglycolate), ethylene bis(2-hydroxyethyl sulfide) bis (thioglycolate), pentaerythritol tetra(thioglycolate), dipentaerythritol hexa(thioglycolate), tetra(3-mercaptopropionic acid) pentaerythritol ester and 1,2-bis[(2-mercaptoethyl)thio]-3-mercaptopropane, preferably one or more of ethylene glycol bis(thioglycolate), glycerol tris(thioglycolate), butanediol bis(thioglycolate), trimethylolpropane tris (thioglycolate), ethylene bis(2-hydroxyethyl sulfide) bis (thioglycolate), pentaerythritol tetra(thioglycolate), dipentaerythritol hexa(thioglycolate), tetra(3-mercaptopropionic acid) pentaerythritol ester and 1,2-bis[(2-mercaptoethyl)thio]-3-mercaptopropane.

The turbidity of the isocyanate present in the isocyanate raw material used in the raw material composition may be controlled by subjecting an isocyanate compound to separation and purification and/or controlling storage conditions of the isocyanate. The separation and purification can adopt conventional purification methods in the art as long as these separation and purification methods can control the turbidity of the isocyanate within the preceding range (for example, less than or equal to 2 NTU, less than or equal to 1 NTU, less than or equal to 0.5 NTU, less than or equal to 0.3 NTU, etc.), for example, rectification, which is the conventional separation and purification method, and others are not repeated here.

An important reaction characteristic of an isocyanate component in the raw material composition is a self-polymerization tendency of an NCO group and a reaction of the NCO group with an active hydrogen-containing substance. The present disclosure finds that suitable storage and use conditions are conducive to obtaining the polyurethane optical resin with excellent indicators. To facilitate the material being used more stably, it seems necessary to explore appropriate humidity for storing the isocyanate raw material. The turbidity of the isocyanate can be controlled by selecting suitable storage conditions for the isocyanate raw material, where when the isocyanate is placed exposed, an ambient relative humidity is controlled to be less than or equal to 35%, an aromatic isocyanate is controlled to be placed for a time of less than or equal to 48 h, and an aliphatic isocyanate is controlled to be placed for a time of less than or equal to 240 h, preferably less than or equal to 144 h.

Specific processes of preparing the polyurethane optical resin through the polymerization reaction of the isocyanate and the polythiol compound are well-known in the art, are well-known techniques in the art, and are not the focus of the present disclosure. Thus, they are not repeated here one by one. A preparation process mainly includes stirring and mixing components in the raw material composition and then degassing and curing the mixture to obtain the polyurethane optical resin. Generally, an injection molding polymerization is employed to manufacture the polyurethane optical resin. Specifically, the isocyanate, the polythiol compound and other additives added as required are mixed; the mixture is degassed, implanted into an injection mold for optical materials, and in general, slowly heated from a low temperature to a high temperature, for example, programmed from room temperature to 120° C. for polymerization and curing; then, after demolding followed by secondary curing, the optical material is obtained.

The reaction of the isocyanate with the polythiol compound is three-dimensional polycondensation. According to a three-dimensional polycondensation theory, a reaction ratio of two monomers is calculated based on a ratio of functional groups that react with each other. To increase a degree to which functional groups react and then further improve a molecular weight of a three-dimensional polycondensation polymer, a molar ratio of the NCO group to an SH group needs to be controlled within a range of (0.8-1.3):1, preferably (0.9-1.2):1.

To obtain a required reaction rate, a polymerization catalyst may be added to the raw material composition for preparing the polyurethane optical resin. The catalyst is, for example, dibutyltin dichloride. Based on a total amount of the catalyst used, optionally, the amount of the catalyst may be, for example, 0.01-5.0 wt %, preferably 0.01-3 wt % (based on a total weight of the isocyanate and the polythiol compound required for preparing the polyurethane optical resin). In addition to dialkyltin halides such as dibutyltin dichloride and dimethyltin dichloride, dialkyltin dicarboxylates such as dimethyltin diacetate, dibutyltin dioctanoate and dibutyltin dilaurin may also be used.

In addition, depending on the object, one or more of various auxiliary agents such as chain extenders, cross-linkers, light stabilizers, ultraviolet absorbers, antioxidants, oil-soluble dyes, fillers and release agents may be added identically as in known methods for preparing the polyurethane optical resin. Each auxiliary agent may be added in an amount of, for example, 0.05-3.0 wt %, preferably 0.05-1 wt % (based on the total weight of the isocyanate and the polythiol compound required for preparing the polyurethane optical resin).

A polyurethane optical resin is obtained by the preceding preparation method. The resin may be further machined into a product.

An optical product is made of the preceding polyurethane optical resin. Various optical products made of the polyurethane optical resin obtained by the preparation method of the present disclosure are, for example, but not limited to, a lens, a prism, an optical fiber, an information recording substrate and an optical filter.

The optical product obtained by the preceding method of the present disclosure has a yellowness index (YI) of less than or equal to 2.2 and an average transmittance of greater than or equal to 80% within a visible light spectrum range (380 nm-780 nm).

Transmittance refers to a ratio of a light flux of the product to an incident light flux. For optical products, the higher the transmittance and the smaller the reflection and absorption, the clearer the optical products can be. According to the half-wave superposition principle of a wave theory, the transmittance of the optical product can be improved through hardening and a combination of coatings with multiple refractive indexes.

The yellowness index (YI) refers to a degree to which a polymer material deviates from white or a degree of yellowing. In practice, with a magnesium oxide standard white board under a standard light source as reference, YI is calculated using the reflectance (or transmittance) of a sample for red, green and blue light to measure the shade of yellow. The smaller the yellowness index (YI), the better the hue of the product; the larger the YI, the worse the hue.

In addition to the yellowness index and transmittance, haze is used for characterizing a degree of optical scattering. Haze is a ratio in percentage of a scattered light flux that passes through the lens and deviates from the direction of incident light to a transmitted incident light flux. The haze is not only a technical indicator for evaluating scratch resistance of a lens surface (with a falling sand test) but also one of the reliable data for determining the transparency and image clarity of the optical material. Two main indicators for evaluating a light scattering material are transmittance and haze. Under normal circumstances, the transmittance and haze of a material are converse: a material with high transmittance has low haze and vice versa.

The present disclosure achieves the following beneficial effects by using the preceding technical solutions:

(1) According to the preparation method of the present disclosure, the quality of the raw material can be quickly and easily controlled, subtle differences between raw materials can be found, and the polyurethane resin optical product with excellent performance can be prepared at a lower cost and with higher efficiency. The obtained optical product has a yellowness index (YI) of less than or equal to 2.2 and an average transmittance of greater than or equal to 80% within the visible light spectrum range (380 nm-780 nm).

(2) The turbidity of the isocyanate is further controlled so that the product can be effectively prevented from ripples, faintness, spots or blisters, the appearance quality of the product can be effectively improved, and the defective percentage can be significantly reduced.

DETAILED DESCRIPTION

Figure 1:
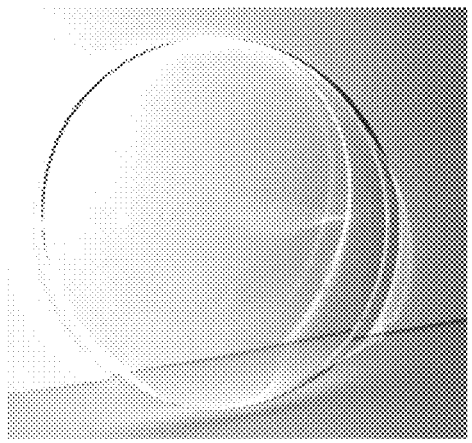
FIG. 1 shows the appearance of a cured piece of Example 1.

For a detailed understanding of technical features and contents of the present disclosure, preferred embodiments of the present disclosure are described in more detail below. Although the preferred embodiments of the present disclosure are described through examples, it is to be understood that the present disclosure may be implemented in various manners and should not be limited to the embodiments set forth herein.

Unless otherwise specified, "turbidity" herein refers to the turbidity of an isocyanate.

The following examples and comparative examples of the present disclosure are analyzed by the following instruments:

A HACH2100N turbidimeter used in a turbidity test is produced by HACH in the United States and has a measurement range of 0-10000 NTU and a division value of 0.01 NTU. The scattering manner of the HACH2100N turbidimeter includes 90° scattering, forward scattering, backward scattering and transmission. The measurement range may be automatically selected, a tungsten lamp is used as a light source, and light with a wavelength of 400-600 nm is used.

The product is evaluated by the following methods:

The turbidity of a sample is determined as follows:

an instrument is turned on and warmed up for 30 min;

the sample is transferred to a dry and clean sample bottle and a bottle stopper is tightened, and bubbles are avoided when the sample is poured;

the outer wall of the sample bottle is wiped with a microfiber dust-free cloth, and silicone oil with a proper amount is applied depending on scratches on the outer wall and wiped evenly;

a minimum range that can be set is used during determination, the sample is put into a sample groove, and an orientation mark on the sample bottle is aligned with an orientation mark protruding from the front of a container chamber; and after a measured value is stable, a result is read.

Standard Calibration:

According to a sample test method, a calibration curve is drawn using a turbidity standard solution in a calibration mode.

An analysis result is reported to a second decimal place in NTUs.

Temperature and humidity conditions under which the sample is placed are controlled with a constant temperature and humidity box GT-7005-A2M from Gotech Testing Machines (Dongguan) Co., Ltd.

The yellowness index and transmittance of a solid polymer are tested with a HunterLab USVIS 1839 color difference meter. A fixed mold is used for preparing samples in the test.

Qualification ratio: In this example, 100 pieces are visually observed under a high-pressure mercury lamp, and products with phenomena that local refractive index is different from the surrounding normal refractive index due to different composition, such as ripples and bubbles, are determined to be unqualified and counted to calculate the qualification ratio.

Raw materials, metaxylylene diisocyanate (XDI) and cyclohexyl dimethylene diisocyanate ($H_6$XDI), are used in the following examples, and the turbidity of the isocyanate is analyzed with a turbidimeter.

The isocyanate raw materials used in the following examples and comparative examples are subjected to GC chromatography and moisture analysis, to obtain that the content of water is less than 100 ppm, the GC purity is greater than 99.51% (A/A), the content of chlorinated impurities is less than 0.025% (A/A), and the content of cyano impurities is less than 0.015% (A/A). A polythiol compound adopts the commercially available raw material, where a main content is 91.0%-95.0% (A/A), the rest is a mixture containing mercapto groups, and the content of water is less than 500 ppm. The raw materials used in the examples and comparative examples exclude the effect of known related impurities and moisture on the quality of an optical resin.

In examples and comparative examples, 1 part by mass is 30 g.

Example 1

50 parts by mass of metaxylylene diisocyanate (XDI, 99.79% purity) with a turbidity of 0.242 NTU were added into a reaction kettle with a stirrer, and 0.015 parts by mass of dibutyltin dichloride as a catalyst, 0.10 parts by mass of acidic phosphate ester (Stepan, Zelec UN) and 0.05 parts by mass of an ultraviolet absorber (Rianlon, RIASORB UV531) were added at 25° C., mixed and dissolved. Then, 50 parts by mass of a polythiol compound, 1,2-bis[(2-mercaptoethyl)thio]-3-mercaptopropane (Jingbo Chemical, polythiol 501) were added based on a molar ratio of 1.08 of an NCO group to an SH group and mixed for 1 h at room temperature and at a rotational speed of 100 rpm to form a polymerizable raw material composition. After cooled to 20° C., the polymerizable raw material composition was degassed for 1.5 h at 2 kPa (absolute pressure) and 25° C., injected into a lens mold, heated from 20° C. to 120° C. for 24 h in an oven so that the raw material composition was polymerized and cured. Secondary curing was performed at 120° C. for 2 h after demolding to obtain an optical material. 100 pieces were prepared in the same batch and a proportion of qualified products was counted. Test results are shown in Table 1. The appearance of the obtained optical material piece after curing is shown in FIG. 1.

Example 2

The isocyanate raw material used in this example was basically the same as that in Example 1 except that 51 parts by mass of XDI with a turbidity of 0.35 NTU and 49 parts by mass of 1,2-bis[(2-mercaptoethyl)thio]-3-mercaptopropane were added based on a molar ratio of 1.13 of the NCO group to the SH group. In addition, the polymerizable raw material composition was synthesized and plastic lens were manufactured in the same manner as in Example 1. The results are shown in Table 1.

Example 3

The isocyanate raw material used in this example was basically the same as that in Example 1 except that 47 parts by mass of XDI with a turbidity of 0.55 NTU and 53 parts by mass of 1,2-bis[(2-mercaptoethyl)thio]-3-mercaptopropane were added based on a molar ratio of 0.96 of the NCO group to the SH group. In addition, the same operations were performed in this example as in Example 1. The results are shown in Table 1.

Example 4

The isocyanate raw material used in this example was basically the same as that in Example 1 except that 52 parts by mass of XDI with a turbidity of 1.93 NTU and 48 parts by mass of 1,2-bis[(2-mercaptoethyl)thio]-3-mercaptopropane were added based on a molar ratio of 1.17 of the NCO group to the SH group. In addition, the same operations were performed in this example as in Example 1. The results are shown in Table 1. The appearance of a defective product among the optical material pieces obtained after curing is shown in the left image in FIG. 2.

Comparative Example 1

The isocyanate raw material used was basically the same as that in Example 1 except that the isocyanate had a different turbidity. In this example, XDI with a turbidity of 8.12 NTU was used. In addition, the same operations were performed in this comparative example as in Example 1. The results are shown in Table 1.

Comparative Example 2

The isocyanate raw material used was basically the same as that in Example 1 except that the isocyanate had a different turbidity. In this example, XDI with a turbidity of 30.23 NTU was used. In addition, the same operations were performed in this comparative example as in Example 1. The results are shown in Table 1.

Comparative Example 3

The isocyanate raw material used was basically the same as that in Example 1 except that the isocyanate had a different turbidity. In this example, XDI with a turbidity of 2330 NTU was used. In addition, the same operations were performed in this comparative example as in Example 1. The results are shown in Table 1. The appearance of a defective product among the optical material pieces obtained after curing is shown in the right image in FIG. 2.

Example 5

54 parts by mass of cyclohexyl dimethylene diisocyanate (H$_6$XDI) (Wanhua Chemical, WANNATE XR-2006, 99.91% purity) with a turbidity of 0.194 NTU were added into a reaction kettle with a stirrer, and 0.03 parts by mass of dibutyltin dichloride as a catalyst, 0.10 parts by mass of acidic phosphate ester (Stepan, Zelec UN) and 0.05 parts by mass of an ultraviolet absorber (Rianlon, RIAS ORB UV531) were added at 25° C., mixed and dissolved. Then, 46 parts by mass of 1,2-bis[(2-mercaptoethyl)thio]-3-mercaptopropane were added based on a molar ratio of 0.93 of the NCO group to the SH group and mixed for 1 h at room temperature and at a rotational speed of 100 rpm to form a polymerizable raw material composition. After cooled to 20° C., the polymerizable raw material composition was degassed for 1 h at 2 kPa and 25° C., injected into a lens mold, heated from 20° C. to 120° C. for 24 h in an oven so that the raw material composition was polymerized and cured. Secondary curing was performed at 120° C. for 2 h after demolding to obtain an optical material. Test results are shown in Table 1.

Example 6

The isocyanate raw material used in this example was basically the same as that in Example 5 except that 55 parts by mass of H$_6$XDI with a turbidity of 0.563 NTU and 45 parts by mass of 1,2-bis[(2-mercaptoethyl)thio]-3-mercaptopropane were added based on a molar ratio of 0.97 of the NCO group to the SH group. In addition, the same operations were performed in this example as in Example 5. The results are shown in Table 1.

TABLE 1

Evaluation results of optical materials synthesized by raw materials with different turbidity values in examples and comparative examples

| Item | | XDI Example | | | | Comparative Example | | | H$_6$XDI Example | |
|---|---|---|---|---|---|---|---|---|---|---|
| No. | | 1 | 2 | 3 | 4 | 1 | 2 | 3 | 5 | 6 |
| Monomer turbidity/NTU | | 0.242 | 0.35 | 0.55 | 1.93 | 8.12 | 30.23 | 2330 | 0.194 | 0.563 |
| Average transmittance/% | | 84.60 | 83.50 | 83.17 | 80.58 | 79.97 | 77.82 | 72.37 | 84.77 | 83.76 |
| Transmittance/% | 400 nm | 72.19 | 65.48 | 61.73 | 65.42 | 60.41 | 56.03 | 51.16 | 72.76 | 65.61 |
| | 450 nm | 87.61 | 86.48 | 86.14 | 86.40 | 82.30 | 79.71 | 73.32 | 87.22 | 86.55 |
| | 550 nm | 88.09 | 87.70 | 87.47 | 87.59 | 83.61 | 81.55 | 75.76 | 88.34 | 88.73 |
| | 650 nm | 88.33 | 88.14 | 87.98 | 84.93 | 84.66 | 82.85 | 77.41 | 88.85 | 88.15 |
| Haze/% | | 0.68 | 0.89 | 2.34 | 3.20 | 9.22 | 72.41 | 83.31 | 0.12 | 1.05 |
| Yellowness index | | 1.72 | 1.78 | 1.80 | 1.85 | 1.92 | 1.97 | 2.03 | 1.09 | 1.69 |
| Qualification ratio | | 95% | 93% | 89% | 75% | 0% | 0% | 0% | 94% | 89% |

Note:
Pieces with a thickness of 6 mm for the test, and C/2 light source; products that are turbid and opaque are all unqualified products.

As can be seen from the comparison results of the preceding examples and comparative examples, the turbidity of the isocyanate raw material has a great effect on the incidence of optical deformation. When the turbidity is controlled within a certain range, the product quality can be effectively guaranteed. Especially when the turbidity of the isocyanate raw material is less than 0.35 NTU, the obtained optical materials have better physical properties and a higher qualification ratio. However, as the turbidity of an isocyanate compound increases, various indicators of the product gradually deteriorate, resulting in a decline in product quality.

Figure 2:
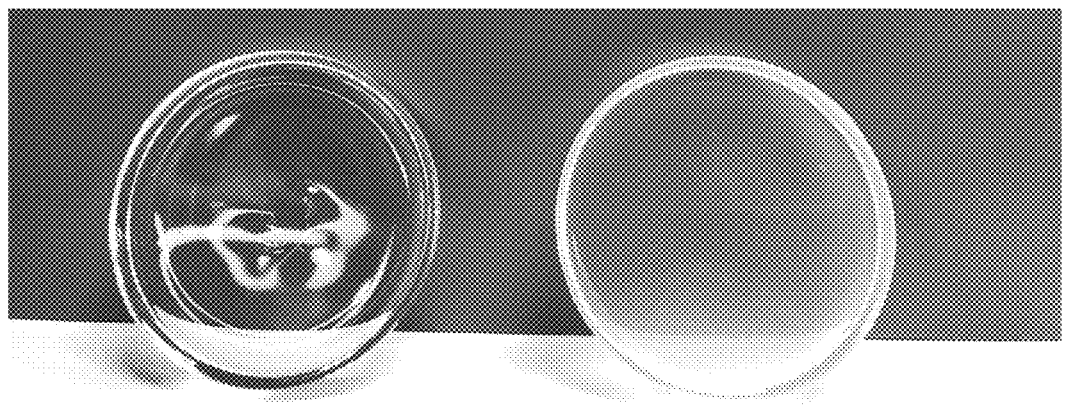
FIG. 2 shows the appearance (left image) of a defective product among cured pieces in Example 4 and the appearance (right image) of a cured piece in Comparative Example 3.

In addition, FIG. 1 shows the appearance of a qualified piece obtained in Example 1, and FIG. 2 shows the appearance of two pieces which are respectively reflected in the left image and right image. As can be seen from the comparison in appearance of the cured pieces in FIG. 1 and FIG. 2, the qualified piece in FIG. 1 is transparent in appearance and good in quality, the piece obtained in Comparative Example 3 and shown in the right image in FIG. 2 is turbid and opaque in appearance, and the defective piece obtained in Example 4 and shown in the left image in FIG. 2 has obvious ripple deformation in appearance. This indicates that under the same formula system, a monomer with a high turbidity has a relatively great effect on the quality of the prepared optical material, and the turbidity of the monomer needs to be limited within a certain range to ensure the preparation of high-quality optical materials.

As in actual use, after opening the material packaging barrel, there will be a certain amount of time to place. The present disclosure also investigates the change of turbidity during the placement of raw materials, monomers XDI and H₆XDI.

Example 7

A constant temperature and humidity box was used whose temperature was set to 30° C. (an ambient temperature of a general machining workshop), multiple 1000 mL wide-mouth glass bottles were placed exposed therein, 1000 g of XDI was put in each bottle and sampled and analyzed every 24 hours. A humidity setting was adjusted after a group of constant humidity experiments. The experimental results are shown in Table 2.

TABLE 2

Change in turbidity (unit: NTU) of XDI stored exposed under different humidity with time

| Placement time | Storage humidity | | | |
| --- | --- | --- | --- | --- |
| | 18% | 25% | 35% | 50% (Comparative Condition) |
| Initial | 0.210 | 0.210 | 0.210 | 0.210 |
| 24 h | 0.227 | 0.239 | 0.245 | 0.256 |
| 48 h | 0.279 | 0.285 | 0.300 | 0.376 |
| 72 h (Comparative Condition) | 3.590 | 4.120 | 5.130 | 6.88 |
| 96 h (Comparative Condition) | 15.89 | 16.99 | 18.43 | 20.53 |
| 120 h (Comparative Condition) | 1327 | 2020 | 2355 | 2654 |

Example 8

A constant temperature and humidity box was used whose temperature was set to 30° C., multiple 1000 mL wide-mouth glass bottles were placed exposed therein, 1000 g of H₆XDI was put in each bottle and sampled and analyzed every 24 hours or at regular intervals of an integer multiple of 24 h. A humidity setting was adjusted after a group of constant humidity experiments. The experimental results are shown in Table 3.

TABLE 3

Change in turbidity (unit: NTU) of H₆XDI stored exposed under different humidity with time

| Placement time | Storage humidity | | | |
| --- | --- | --- | --- | --- |
| | 18% | 25% | 35% | 50% (Comparative Condition) |
| Initial | 0.130 | 0.130 | 0.130 | 0.130 |
| 24 h | 0.133 | 0.135 | 0.138 | 0.141 |
| 48 h | 0.137 | 0.139 | 0.141 | 0.146 |
| 72 h | 0.145 | 0.148 | 0.149 | 0.153 |
| 96 h | 0.148 | 0.152 | 0.163 | 0.166 |
| 120 h | 0.153 | 0.171 | 0.177 | 0.178 |
| 144 h | 0.165 | 0.198 | 0.212 | 0.222 |
| 240 h | 0.310 | 0.350 | 0.378 | 0.413 |

According to the analysis results in Table 2 and Table 3, it is found that the turbidity of XDI increases significantly faster than that of H₆XDI when they are placed exposed, and the product quality can be controlled by controlling the storage time of the isocyanate raw material used for preparing the polyurethane optical resin. As can be seen from Table 2, use conditions of the isocyanate need to be controlled: the relative humidity is controlled within 35% and XDI is controlled to be used up within 48 h. As can be seen from Table 3, H₆XDI is relatively stable and the quality of the optical resin can be guaranteed within 240 h.

The polyurethane resin obtained through the reaction of the isocyanate compound with the polythiol compound is colorless and transparent, has a high refractive index and low dispersion, and is particularly suitable as a plastic lens with excellent impact resistance, tintability and machinability. Control indicators proposed by the present disclosure can ensure the product quality so that optical products are stably prepared.

Various embodiments of the present disclosure have been described above. The preceding description is illustrative and not exhaustive, and is not limited to the disclosed various embodiments. Without departing from the scope and spirit of the various embodiments described, various modifications and changes are apparent to those of ordinary skill in the art.

What is claimed is:

1. A quality control method of a polyurethane optical resin,
wherein the polyurethane optical resin is prepared by subjecting a raw material composition containing an isocyanate and a polythiol compound to a polymerization reaction to obtain the polyurethane optical resin,
the isocyanate is selected from the group consisting of an aliphatic and an aromatic isocyanate;
the polythiol compound is 1,2-bis[(2-mercaptoethyl)thio]-3-mercaptopropane;
the quality control method comprises controlling exposed placement conditions of the isocyanate as: an ambient relative humidity of the aromatic isocyanate after opening packaging barrel thereof before use to be less than or equal to 35% for less than or equal to 48 h, and an ambient relative humidity of the aliphatic after opening packaging barrel thereof before use to be less than or equal to 35% for less than or equal to 240 h;
the turbidity of the isocyanate in the raw material composition is controlled to be less than or equal to 2 NTU.

2. The method according to claim 1, wherein the preparation method of the polyurethane optical resin comprises stirring and mixing components in the raw material composition and then degassing and curing the mixture to obtain the polyurethane optical resin;
wherein a ratio in amount of the isocyanate to the polythiol compound is based on a molar ratio of an NCO group to an SH group, which is controlled to be (0.8-1.3):1, preferably (0.9-1.2):1.

3. The method according to claim 1, wherein the aliphatic isocyanate is selected from the group consisting of hexamethylene diisocyanate, methylcyclohexyl diisocyanate, dimethylcyclohexyl diisocyanate, dicyclohexylmethane diisocyanate, isophorone diisocyanate, norbornane diisocyanate and cyclohexyl dimethylene diisocyanate.

4. The method according to claim 1, wherein the aromatic isocyanate is selected from the group consisting of toluene diisocyanate, p-phenylene diisocyanate and xylylene diisocyanate.

5. The method according to claim 1, wherein the isocyanate raw material is selected from the group consisting of cyclohexyl dimethylene diisocyanate and xylylene diisocyanate.

\* \* \* \* \*